(12) United States Patent
Ranta et al.

(10) Patent No.: US 6,775,558 B1
(45) Date of Patent: Aug. 10, 2004

(54) ACCESSORY INTERFACE WITHIN A MULTIPLE CHANNEL RADIO APPARATUS

(75) Inventors: Jukka Ranta, Turku (FI); Jouko Häkkänen, Salo (FI); Seppo Rosnell, Salo (FI); Tapani Ekman, Salo (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/438,153

(22) Filed: Nov. 10, 1999

(30) Foreign Application Priority Data

Nov. 12, 1998 (FI) .................................................. 982450

(51) Int. Cl.⁷ .......................... H04M 1/00; H04B 1/38
(52) U.S. Cl. .......................... 455/557; 455/73; 455/1; 455/450; 455/464; 370/319; 370/344
(58) Field of Search ............................ 455/4, 557, 464, 455/450, 436–443, 103, 73–141, 466; 370/319, 344

(56) References Cited

U.S. PATENT DOCUMENTS

| | | | | |
|---|---|---|---|---|
| 4,659,878 A | * | 4/1987 | Dinkins | 370/71 |
| 5,515,366 A | * | 5/1996 | Chieu et al. | 370/347 |
| 5,594,949 A | * | 1/1997 | Andersson et al. | 455/62 |
| 5,732,074 A | * | 3/1998 | Spaur et al. | 370/313 |
| 5,913,163 A | * | 6/1999 | Johansson | 455/426 |
| 5,943,616 A | * | 8/1999 | Andersson | 455/422 |
| 5,983,073 A | * | 11/1999 | Ditzik | 455/11.1 |
| 5,995,500 A | * | 11/1999 | Ma et al. | 370/337 |
| 5,999,811 A | * | 12/1999 | Molne | 455/432 |
| 6,088,586 A | * | 7/2000 | Haverty | 455/422 |
| 6,128,510 A | * | 10/2000 | Beukema et al. | |
| 6,178,164 B1 | * | 1/2001 | Wang et al. | 370/331 |
| 6,181,956 B1 | * | 1/2001 | Koskan | 455/566 |
| 6,230,214 B1 | * | 5/2001 | Liukkonen et al. | 710/1 |
| 6,263,218 B1 | * | 7/2001 | Kita | 455/567 |
| 6,266,321 B1 | * | 7/2001 | Pehkonen et al. | 370/206 |
| 6,272,359 B1 | * | 8/2001 | Kivela et al. | 455/567 |
| 6,285,757 B1 | * | 9/2001 | Carroll et al. | 345/619 |
| 6,285,889 B1 | * | 9/2001 | Nykanen et al. | 455/557 |
| 6,295,461 B1 | * | 9/2001 | Palmer et al. | 455/557 |
| 6,308,062 B1 | * | 10/2001 | Chien et al. | 45/420 |
| 6,327,476 B1 | * | 12/2001 | Koscal | 455/462 |
| 6,393,301 B1 | * | 5/2002 | Oda | 455/557 |
| 6,484,027 B1 | * | 11/2002 | Mauney et al. | 455/421 |

FOREIGN PATENT DOCUMENTS

| | | |
|---|---|---|
| EP | 080465 A2 | 5/1998 |
| EP | 0840465 A2 | 5/1998 |
| WO | WO 94/09584 | 4/1994 |
| WO | WO 98/10612 | 3/1998 |
| WO | WO 99/25141 | 5/1999 |

OTHER PUBLICATIONS

Search Report.
"Short Range Radio Based Ad–hoc Networking: Performance And Properties", Johansson et al., IEEE International Conference On Communications, vol. 3, 1999.

* cited by examiner

Primary Examiner—William Trost
Assistant Examiner—Stephen D'Agosta
(74) Attorney, Agent, or Firm—Perman & Green, LLP

(57) ABSTRACT

For establishing a local communication connection between a terminal (102) of a cellular radio system and an accessory device (103), a radio channel is identified (301, 302) on which there is no perceivable radio traffic in the cellular radio system, and a communication connection is established (303, 501) between the terminal and the accessory device on the identified radio channel. The radio channel is preferably a code channel of a CDMA system.

37 Claims, 3 Drawing Sheets

ACCESSORY INTERFACE WITHIN A
MULTIPLE CHANNEL RADIO APPARATUS

TECHNOLOGICAL FIELD

The invention concerns generally the transmission of information between a terminal of a cellular radio system arid an accessory device. Especially the invention concerns an accessory interface that sets relatively few structural requirements to the terminal.

BACKGROUND OF THE INVENTION

A terminal of a cellular radio system has conventionally been a mobile telephone, but together with the evolution of the cellular radio systems a number of other terminal types have emerged. According to expectations, the terminal of a future cellular radio system will combine at least some of the features of a video telephone, portable telefax, palmtop computer, positioning device and many other portable electronic devices previously known as separate units.

Already at the mobile telephone stage a need has been recognised to furnish the terminal with an accessory interface, and this trend will certainly continue intensively with the more diversifed terminal types. An accessory device is typically an auxiliary computer, a camera, a printer, a mass memory device or some other device that has some features that are missing from the mobile terminal and that is meant to be used locally, i.e. in the immediate vicinity of the terminal, in the same room or at least within a short walking distance. The conventional way of providing an interface for transmitting information between an accessory device and a terminal is a cable. Recently also an infrared interface has gained popularity.

The drawbacks of the prior art accessory interfaces relate to the structural requirements they set to the terminal. A cable necessitates a cable connector to be built in the terminal, and an infrared interface requires an infrared transceiver. These must be located in the terminal in suitable positions for easy operation, whereby they reserve a part of the outer cover of the terminal. A cable connector is prone to dirt and corrosion and its appearance is not always in accordance with the esthetical aims of a designer. The lens of an infrared transmitted may become dirty or scratched, causing unreliable transmissions. Additionally one must take into account the driver circuits that are indispensible for operating a cable connection or an infrared transceiver but require space from within the terminal and consume power.

SUMMARY OF THE INVENTION

It is an object of the present invention to provide an accessory interface for the transmission of information between a terminal and an accessory device without the drawbacks that are characteristic to the prior art solutions. It is a further object of the invention to provide an accessory interface that sets only few structural requirements to the terminal. Additionally it is an object of the invention to provide a method for using said accessory interface.

The objects of the invention are achieved by using at least partly the same structural elements for the accessory interface that are used for the radio interface between the terminal and the other parts of the cellular radio system.

It is characteristic to a terminal of a cellular radio system according to the present invention that the terminal comprises means for identifying a radio channel on which there is no perceivable radio traffic in the cellular radio system and means for establishing a local communication connection between the terminal and an accessory device on the identified radio channel.

The invention applies also to an accessory device with the characteristic feature that it comprises an adjustable radio transceiver for establishing communication connections with a terminal of a cellular radio system on a selectable radio channel.

Additionally the invention also applies to a method comprising as its characteristic features the steps of identifying a radio channel on which there is no perceivable radio traffic in the cellular radio system, and establishing a communication connection between the terminal and the accessory device on the identified radio channel.

According to the invention, one should not neglect the fact that by definition, any terminal of a cellular radio system already includes an interface: the radio interface between the terminal and a base station that belongs to the fixed parts of the cellular radio system. By using basically the same or similar structural parts also for the accessory interface it is possible to achieve major savings in the component count, physical size and power consumption of a terminal.

If some of the functions and components related to the radio interface must be shared between the actual radio interface and the accessory interface, a suitable multi-use or multiple access scheme must be applied. Here again we may note that in the cellular radio system there already exists a multiple access scheme for allowing a large number of terminals to use the services of a relatively limited number of base stations. Conventional multiple access schemes comprise TDMA (Time Division Multiple Access), CDMA (Code Division Multiple Access) and FDMA (Frequency Division Multiple Access) arrangements as well as combinations of these. According to an advantageous embodiment of the invention the aspects of the cellular radio system's multiple access scheme are applied to divide the capacity of the terminal between the actual radio interface and the accessory interface.

In a CDMA embodiment of the present invention the accessory interface of the terminal takes advantage of the fact that in any given cell there is always only a very limited number of spreading codes in use compared to the total available code space, i.e. the number of spreading codes that may be generated according to the existing code generation rules. One of the unused spreading codes is simply selected for use in the communication between the terminal and the accessory device. Alternatively a separate code space may be used for the purposes of the accessory interface.

In a TDMA embodiment of the present invention there may be unused time slots, during which the terminal may communicate with the accessory device. Similarly in a FDMA embodiment some otherwise unused frequency is reserved for communication between the terminal and the accessory device. However, these embodiments of the invention are not regarded as being as advantageous as the CDMA embodiment, because the number of available time slots and the number of available frequencies is usually much more limited than the number of available spreading codes. Also the structure of the radio frequency part of the terminal would have to be slightly more complicated.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
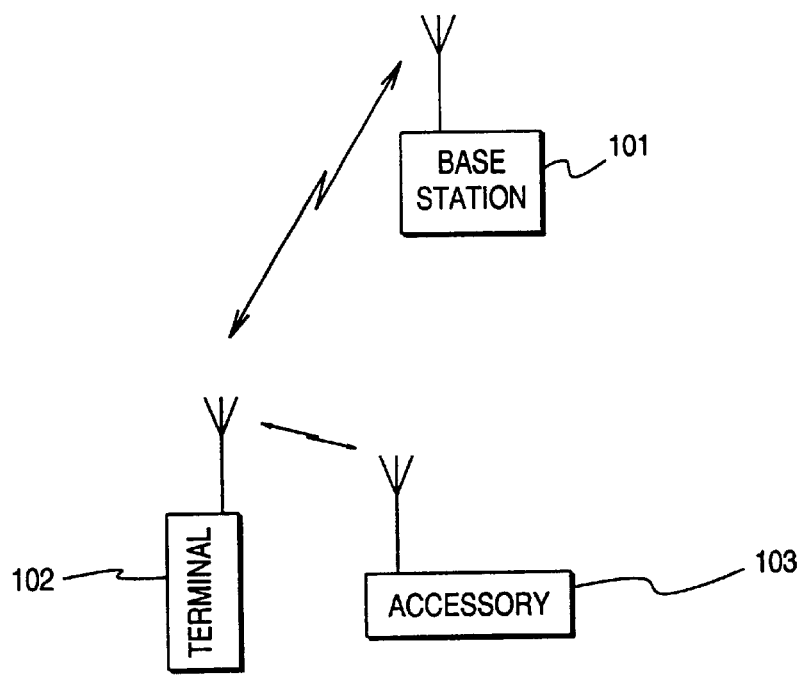
FIG. 1 is a system overview of the present invention.

FIG. 1 illustrates a simple wireless telecommunication system comprising a base station 101, a terminal 102 and an accessory device 103. For the sake of example we may assume that the base station 101 belongs to the fixed parts of a cellular radio system, in which case it is coupled to a Base Station Controller (BSC), a Radio Network Controller (RNC), a Mobile Switching Centre (MSC) or some other higher-level structure of the cellular radio system; for the sake of clarity these are not shown in FIG. 1. The cell or coverage area of the base station 101 may be of any size from a picocell of a low-power single-room base station to a megacell of a high-power satellite-mounted base station. The single base station of a wireless telephone that is wire-connected to the Public Switched Telephone Network (PSTN) may be regarded as a single-cell cellular radio system, so it is also within the scope of the present invention.

The terminal 102 may be a cellular radio system terminal of any kind, including but not being limited to a mobile telephone, a wireless telephone handset, a video telephone, a computer, a telefax, a pager and a positioning device. The invention does not require it to be portable; there are also fixed and semi-fixed terminals in cellular radio systems. The terminal comprises a radio transceiver (not separately shown) for communicating with the base station 101 over a radio interface. Similarly the type of the accessory device 103 is not limited by the invention. It may be an auxiliary computer, a camera, a printer, a mass memory device or some other fixed, semi-fixed or portable device in the operation of which it is advantageous to exchange information locally with the terminal 102. The transmission of information between the accessory device 103 and the terminal 102 may take place one-way in either direction or two-way. In some cases also another terminal may be regarded as an accessory device, if there exists a need for exchanging information locally between two terminals without involving the cellular radio system. In these cases the information to be exchanged locally between the two terminals is usually of some other kind than the information to the transmission of which the terminals use the cellular radio system. For example, there is known from prior art a mobile telephone (type Nokia 6110) that includes some recreational games, and the users of two such mobile telephones may play against each other by letting the telephones exchange game-related information locally over an infrared link.

In the following we will first discuss the so-called CDMA embodiment of the invention. Therefore we will assume that CDMA is employed in the cell of the base station 101 for allowing a large number of terminals to employ the services of the base station. More exactly, both the base station 101 and the terminal 102 comprise known means for generating, transmitting, receiving and interpreting a spread-spectrum radio transmission, in which a certain transmission sequence is spread over an available frequency range around a known center frequency by using a pseudorandom spreading code. A large number of known ways exist for producing such a code, and the invention does not limit the actual method used in the system of FIG. 1.

An important feature of CDMA is that the number of available spreading codes is very large. If a simple linear shift register implementation is used to produce the spreading code, there are $2^N-1$ different possible spreading codes where N is the number of bit positions in the linear shift register. These spreading codes have a one-to-one correspondence to the $2^N-1$ different acceptable seed numbers or initializing sequences to the shift register (the all-zeroes sequence is the only unacceptable seed number). It is impossible to have all the possible spreading codes simultaneously in use in any single cell. The total interference level will limit the number of intelligibly receivable transmissions to some tens of simultaneous users.

According to the CDMA embodiment of the invention the terminal 102 will use a spread-spectrum radio transmission with some otherwise unused spreading code to communicate with the accessory device 103. "Otherwise unused" means that the same spreading code is not used in any such simultaneous transmission that either the terminal or the accessory device or both can receive. The selection of such code will advantageously take place according to one of the following mutually alternative selection rules:

1) The device that is making the selection will randomly pick, among the available codes in the cell, a candidate code that it is not itself currently using and try receiving with that code. A natural alternative to random picking is to use some predetermined order. If the power received with the candidate code is higher than a certain threshold value, which is the general noise level added by some previously determined selection marginal that is larger than (or in some special cases equal to) zero, the device deducts that somebody else is currently using the candidate code for transmission. A new candidate code will be picked until with some candidate code the received power is less than said threshold value, whereafter that candidate code is used for transmission between the terminal and the accessory device. The value of the previously determined selection marginal may be a system constant or a parameter indicated in a cell broadcast transmission.

2) The device that is making the selection will randomly pick, among a special set of codes that are available only for accessory interfacing, a candidate code that it is not itself currently using and try receiving with that code. The comparison to the threshold value is performed as above. Said special set of codes may be a particularly defined subset of the spreading codes that may be generated according to the existing code generation rules in the cellular radio system. This is especially applicable if in each cell of the cellular radio system there is only a limited subset of all possible codes available for communication between the terminals and the base station. Said particularly defined subset may then be the set of codes that are not otherwise available in that particular cell, or the set of codes that are not otherwise available in that particular cell or any of its neighboring cells. The particularly defined subset of codes may also comprise codes of completely different length or type than what are used for communication between the terminals and the base station.

3) There is a specifically configured unique spreading code for each particular accessory interface, in which no actual selection is necessary.

4) The device that is making the selection will send to the base station an inquiry for the availability of codes in the cell. As a response, the base station will either tell which codes are currently in use, or indicate a group of codes which are not currently in use, or allocate a code for the use of the inquiring device.

In the selection rules above we have not specified whether the device that is making the selection is the terminal or the accessory device. The invention is not limiting in this respect. However, because the physical distance between the terminal and the accessory device is likely to be very much smaller than the distance between the terminal and the base station, it is advisable to use a very low transmission power in the auxiliary interface compared to the radio interface between the terminal and the base station. It may be advantageous not to equip at all the accessory device with such a powerful transceiver that it could communicate with the base station. Therefore at least in those cases where the selection of the code for the accessory interface requires negotiation with the base station it is most advantageously the terminal that selects the code.

If the selection takes place according to alternative 1), i.e. without the base station actually even knowing that somebody is selecting a certain code for use within an accessory interface, it may be advantageous to obligate the terminal (or the accessory device) to send a signalling message to the base station and identify in the message the selected code so that the base station will not allocate the same code for some connection between it and another terminal. A similar message could be sent at the end of communication over the accessory interface, so that the base station knows that it is free to use the code again.

In all those selection alternatives where the accepting or rejecting of a code is based on a comparison between the received power level and a predetermined threshold value, it is of no practical importance whether the code will be accepted or rejected if the received power level is exactly equal to the threshold value. In practice, equality is almost never found, and in any case the choice of action in an equality case is merely a matter of taste. Naturally some definite action must be specified.

Figure 2:
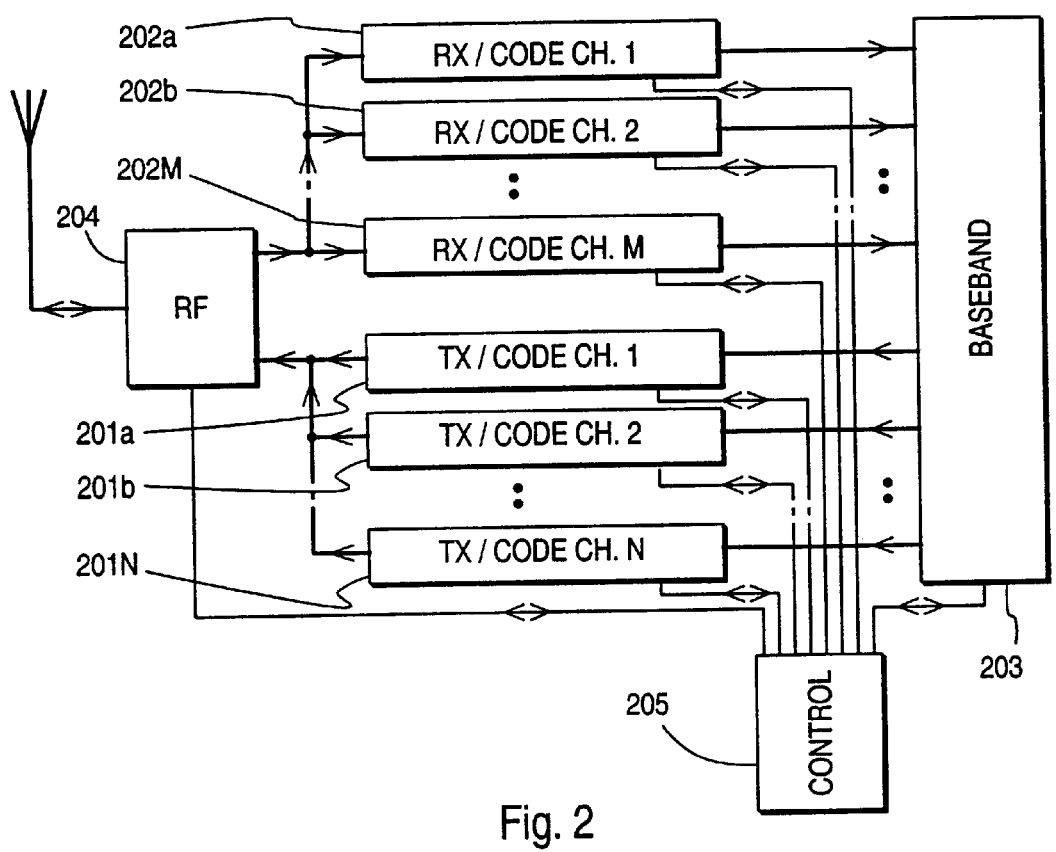
FIG. 2 illustrates som structural aspects of a terminal according to an advantageous embodiment of the invention.

In the simplest case the terminal comprises only one code channel transmitter and one code channel receiver, which means that it can not communicate simultaneously with the base station and the accessory device. However, CDMA networks often require multicode reception and transmission at the radio interface between a mobile terminal and a base station. This in turn dictates that a terminal must comprise a number of parallel arrangements for coded transmission and reception. FIG. 2 illustrates schematically an advantageous structural solution for a terminal. Here the terminal comprises a number of parallel code channel transmitters 201*a*, 201*b*, . . . 201N and a number of parallel code channel receivers 202*a*, 202*b*, . . . 202M, where advantageously but not necessarily N=M. Block 203 illustrates schematically all parts of the terminal that are used to process a "baseband" signal, including any channel en/decoding, speech or video en/decoding, or other processing known as such. Similarly block 204 illustrates all radio known frequency parts that may be used to handle a received or transmitted radio frequency signal irrespective of which code channel it belongs to. A control block 205 is responsible for all controlling functions, including the setting of the codes with which each code channel transmitter and receiver tranmits or receives. It is possible to set a different code or at least a differently timed copy of the same code for each code channel transmitter and receiver. According to a widely accepted definition a copy of a code is regarded as a different code if it is timed so that the cross-correlation between the original code and the differently timed copy is below some predefined limit.

Figure 3:
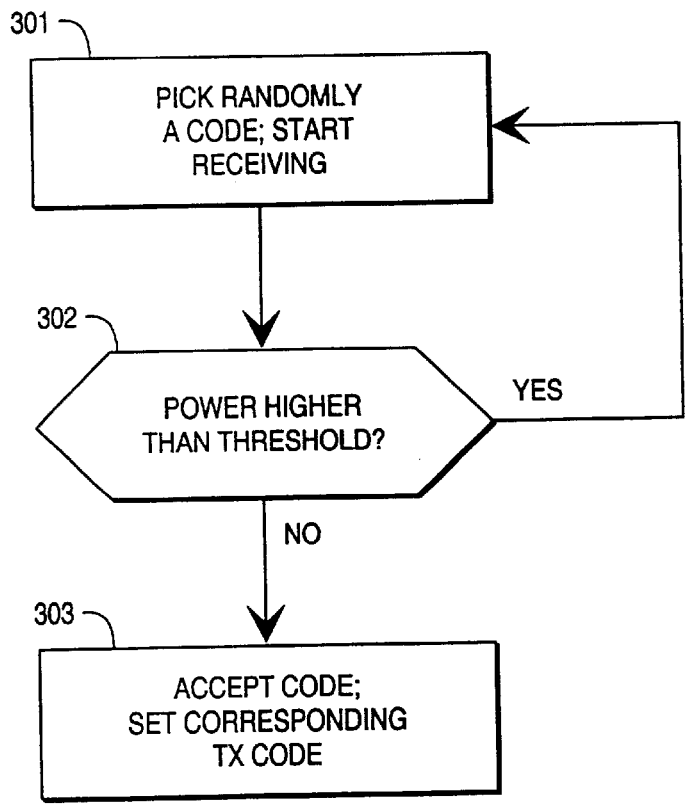
FIG. 3 illustrates a method according to an advantageous embodiment of the invention.

According to the invention the multichannel radio apparatus of FIG. 2 comprises, in addition to its known features, the capability of using a code selected according to at least one of the rules 1)–4) above in one code channel transmitter and/or the same code or some other similarly selected code in one code channel receiver for communicating with an accessory device. To this end the control block 205 is programmed to execute a code selection procedure, which is slightly different depending on which of the rules 1)–4) above is used. For the sake of example we may assume that it is rule 1), in which case the control block is programmed to perform the steps illustrated in FIG. 3. At stage 301, the control block picks randomly one code which the terminal itself is not currently using, and sets it as the reception code for one of the parallel code channel receivers 202*a*, 202*b*, . . . 202M. At stage 302 the control block obtains from that particular code channel receiver an average value of the received power, which it compares to a threshold value which is the simultaneously or previously obtained average value of received noise added by a previously determined selection marginal. The noise value may be obtained from the same code channel receiver or from some other part of the receiving circuitry.

If the comparison of stage 302 indicates that the power received with the randomly selected code is likely to consist only of noise, the control block selects the code for use within the accessory interface at stage 303. If, however, the received power is higher than the treshold value, the control block draws the conlusion that somebody else is currently using the same code, which makes the code unusable for other communications. In that case the control block returns to stage 301 to select another code. The loop consisting of stages 301 and 302 is repeated until an acceptable code is found. In the specifications of a CDMA cellular radio system it is usually defined, how do the receiving code and transmitting code relate to each other that together define a code channel. Once an acceptable receiving code has been found, the control block sets the correponding transmitting code as the code for one of the parallel code channel transmitters 201*a*, 201*b*, . . . 201N. It is also possible to provide a timer that allows only a limited number of rounds around the loop through stages 301 and 302 before the action is terminated and the user is informed that due to traffic congestion, it is impossible to establish a connection to the accessory device for the moment.

If the base station of the cellular radio system (or some other device in the cellular radio system that is responsible for the allocation of codes) is not aware of the reservation of a certain code to the use of a certain accessory interface, it may happen that it allocates the same code to some other connection within the cell. In such a case a new code must be selected to the accessory interface, because it is reasonable to assume that the cellular radio system has a priority right to the allocation of codes. To prepare for a change of code during a communication it is possible to have a process according to FIG. 3 constantly running either in the terminal or in the accessory device or in both so that at any given moment there exists an identified code that is not currently in use in any receivable communication connection.

Figure 4:
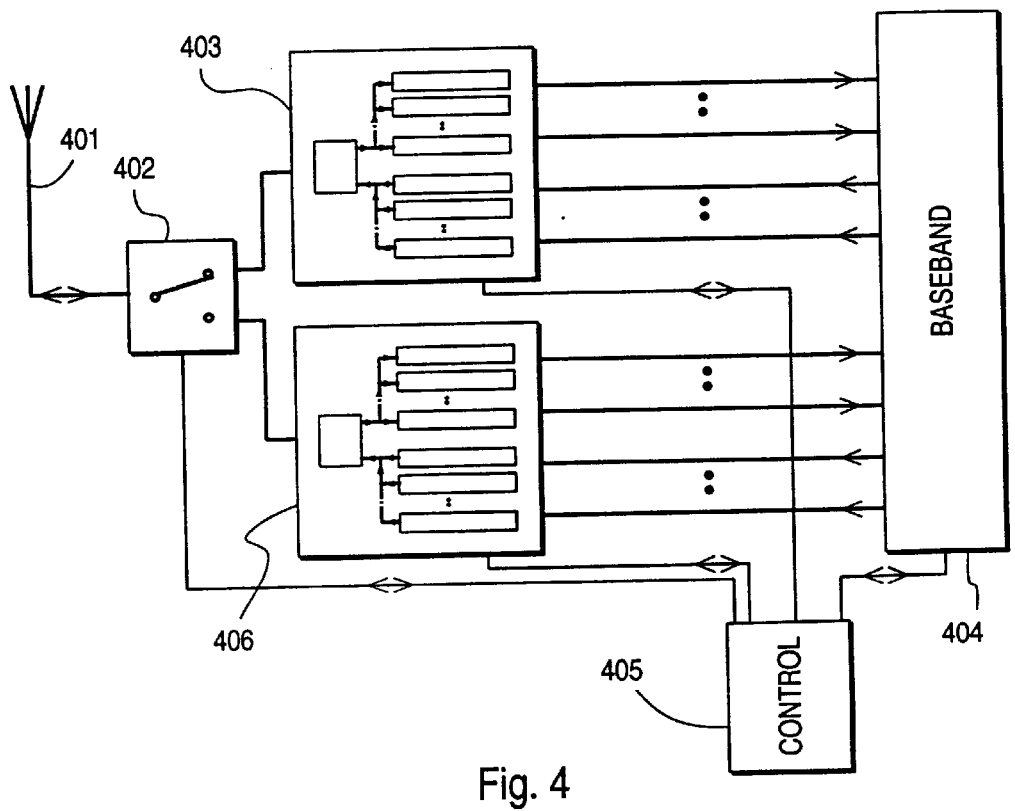
FIG. 4 illustrates another structure for implementing the invention.

FIG. 4 illustrates another type of structure that can be used in a terminal according to the present invention. Here the terminal comprises an antenna 401, a multiplexing switch 402, a multichannel transceiver 403 for communicating with the base station, a baseband block 404, a control block 405 and a separate one—or multichannel radio transceiver 406 for communicating with accessory devices. The difference between the terminals of FIGS. 2 and 4 is that in FIG. 2, the code channel transmitter(s) and receiver(s) that will be allocated for use within the accessory interface are parts of the same multichannel transceiver that is used to communicate with the base station, whereas in the embodiment of FIG. 4 there is a separate transceiver with one or more code channels in each transmission direction for the accessory interface. The multiplexing switch 402 is responsible for arranging the couplings between the different transceivers and the antenna so that the interface-related traffic is kept from interfering with the traffic related to the cellular radio system and vice versa. In a very simple embodiment a multiplexing switch is not needed at all if filtering arrangements or other kind of components known as such guide the radio frequency signals within the terminal with reasonable accuracy.

It is also possible to provide a separate antenna for the accessory interface in a terminal according to FIG. 4, but thereby the advantages of the invention would be lost to a great extent, because very few common parts could be used for the cellular radio system interface and the accessory interface. In the embodiment of FIG. 2 the mentioned advantage is most prominent, because it is possible to use a code channel transmitter and a code channel receiver for the purposes of the accessory interface only for the time when there is a need for the accessory interface to be operative, and as normal channels of the multichannel transceiver at all other times. Even if the specifications of the cellular radio system or some other considerations require that a fixed number of code channels must be allocated to the cellular radio system at all times, the embodiment of FIG. 2 is seen to be the most advantageous. A transceiver designer will most probably implement the code channel transmitters and receivers on an Application Specific Integrated Circuit or ASIC, whereby adding one or a few code channels for the purposes of an accessory interface will not significantly increase the manufacturing costs, demand of space or consumption of power in the terminal.

The structures discussed above in connection with the terminal are easily extended to cover the structures that the accessory device needs to comprise for communicating with the terminal through an accessory interface according to the present invention. For the transmission and reception of radio signals the accessory device must have an antenna and an RF block as well as at least one code channel trasmitter and code channel receiver that operate under the control of a control block. Additionally the accessory device must have a baseband block for handling the baseband output signal of the code channel receiver(s) and—if the accessory device is to transmit other data than what is provided directly from the control block to the code channel transmitter —formatting the data to be transmitted into a baseband input signal for the code channel transmitter(s). It is within the capability of a person skilled in the art to present the detailed structure of such blocks.

The operation of the accessory interface blocks within the accessory device depends on whether it will be required that the accessory device is able to select a suitable code for the accessory interface, or whether the accessory device is a "slave" device in the sense that it always waits for the terminal to select the code and inform the accessory device about which code has been selected. In the first-mentioned case the accessory device must be able to perform the same steps for code selection that we have described previously in connection with the operation of the terminal. In the latter case it suffices for the accessory device to have the capabilities that are described in the following discussion of the establishing, maintaining and closing a data transfer connection between the terminal and the accessory device.

Figure 5:
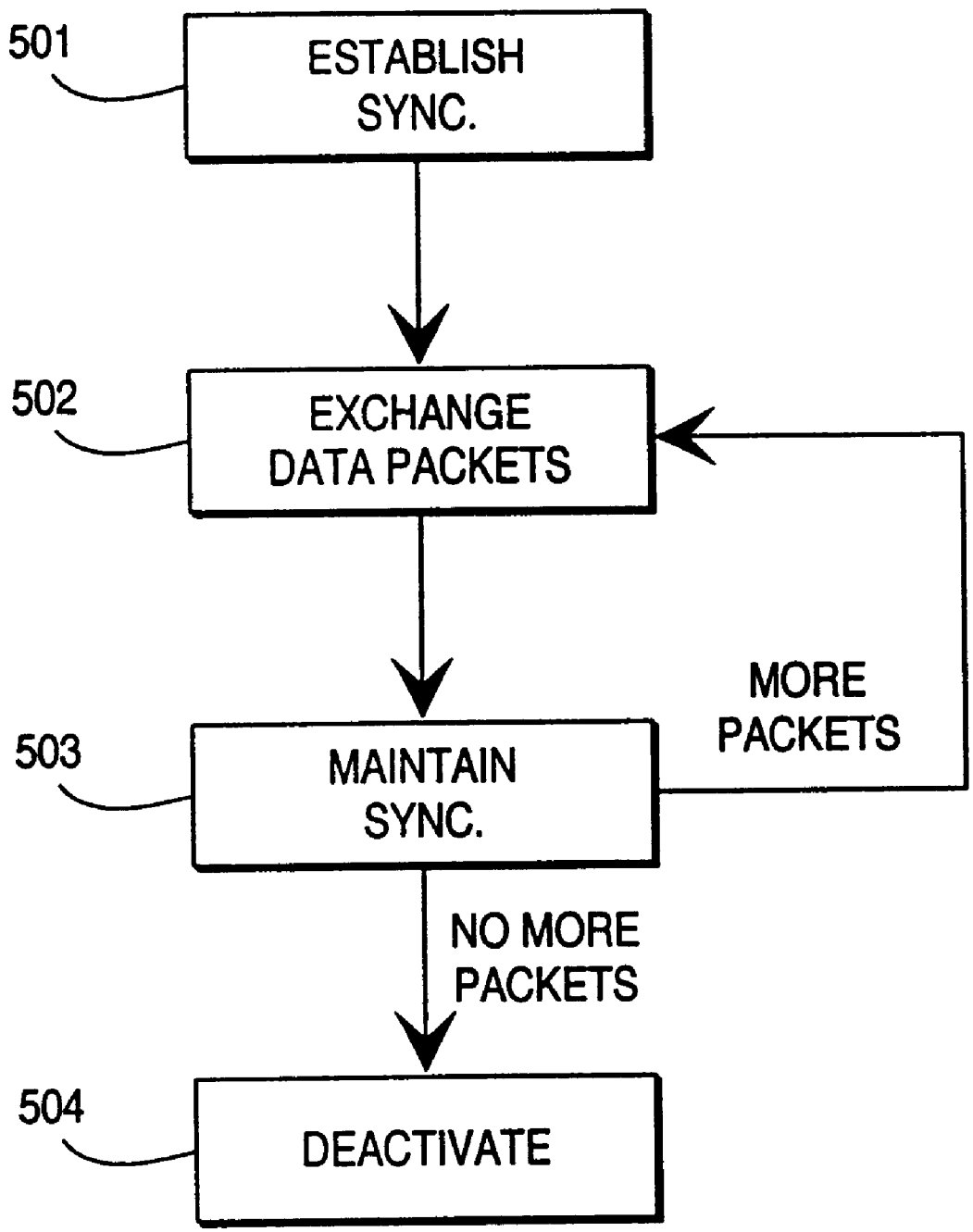
FIG. 5 illustrates further steps of a method according to an advantageous embodiment of the invention.

FIG. 5 illustrates the stages of establishing, maintaining and closing a data transfer connection between the terminal and the accessory device in a typical situation. Stage 501 corresponds to the establishment of synchronisation, which as a generic term is understood as establishing a common time base for the communication at both ends and sharing the knowledge about the spreading code which is to be used. Stage 501 will also comprise all eventual steps for establishing means for authenticated and/or encrypted communication between the terminal and the accessory device. In these respects it corresponds generally to the known initial phase of establishing a communication connection between the terminal and a base station. Stage 501 may be initiated either by the terminal or by the accessory device.

For the sake of example we will assume that only the terminal has the capability of selecting a code for the accessory interface, and that in selecting the code the terminal uses the method described previously in connection with FIG. 3. If stage 501 takes place on the initiation of the terminal, operation starts by the terminal performing the steps 301–303 of FIG. 3 until it has found a suitable code. Thereafter it may inform the accessory device about the commencing transmission on a separate command channel, or it may begin transmitting a synchronisation signal whereby the beginning of this transmission acts as an information about the commencing transmission to the accessory device. The synchronisation signal is most advantageously a so-called pilot signal which means a regular oscillating signal or a piece of data in a previously known form. When the accessory device has detected the synchronisation signal, it transmits an acknowledgement indicating that it is ready for reception. The terminal indicates the selected code by using some indication method known as such, and the accessory device again acknowledges the correct reception of the code indication. To conclude the synchronization stage the terminal and the accessory device may exchange any number of messages that relate for example to the establishment of an authenticated and/or encrypted communication connection.

If stage 501 takes place on the initiation of the accessory device, the operation follows initially a slightly different pattern. Because of our assumption that only the terminal is capable of selecting a code, the accessory device must first transmit a pilot signal or a corresponding indication from which the terminal knows that the accessory device wants to set up a communication connection. If the accessory device transmits as the indication a pilot signal, the terminal may easily synchronise its transceiver to it. The terminal may acknowledge the reception of the indication before starting the code selection according to FIG. 3, or it may start the code selection right away whereby only a subsequent indication about a selected code serves as an acknowledgement. Thereafter the operation may continue as described above.

After successful syncronisation in stage 501 the exchange of data packets between the terminal and the accessory device may begin as illustrated by stage 502 in FIG. 5. It is not mandatory that during a communication connection between a terminal and an accessory device there is all the time some data to be transmitted. The connection may contain idle periods, during which neither of the devices has any data to be transmitted. For maintaining the synchronisation during the idle periods according to stage 503, at least one of the devices may transmit some kind of a null signal, e.g. repetitive pilot symbols with just enough transmission power for the other device to receive. The operation will circulate in the loop constituted by stages 502 and 503 until for some reason the communication connection is deactivated by one of the devices sending a deactivation command and the other acknowledging it according to stage 504. It is also possible that the connection is abruptly ended due to lost syncronisation, which may be caused for example by an increasing level of interference or by one of the devices being switched off.

The invention does not limit the timing of the communication connection over the accessory interface. The connection may be active all the time when a terminal and an accessory device are near enough to each other so that it is possible to establish a connection. Automatic activation of the connection may result when either one of the devices realises that it has data to be transmitted to the other device. For the automatic activation to be successful, at least one of the devices must follow some previously programmed schedule for listening and trying to receive a pilot signal or a corresponding indication. In such cases the connection is typically deactivated when neither of the devices has any more data packets to be transmitted. A short grace period of predetermined length may be applied before deactivating the connection for not to deactivate an established and working connection just because of a short break in the flow of data to be transmitted. There may also be a previously programmed schedule for periodic activation and deactivation of the communication connection. Also manual activation and deactivation of the connection as a result of user action are within the scope of the invention. The invention does not limit any other simultaneous activity performed by either one of the devices; for example the terminal may have simultaneously an active communication connection with a base station on a different code channel.

In the foregoing we have discussed only an interface between a single terminal and a single accessory device. The invention does not limit the number of simultaneous connections from one terminal to several accessory devices, or the number of simultaneous connections from several terminals to one accessory device. For each separate communication connection the above-described functional blocks and operational steps are separately needed. There may also be a number of simultaneous but logically separate connections between a single terminal and a single accessory device. In such cases establishing a further simultaneous connection may be easier than establishing the first connection between the devices, because the common time base created as a part of the synchronisation process of the first connection may be applied in the establishment of the subsequent connections.

Transmission power control is a significant part of all radio connections. In a CDMA cellular radio system a large number of simultaneous, continuous transmissions may share the same frequency band. The transmitted radio signal of one connection represents interference to all other connections, and communication will only be possible if the general interference level experienced in any single connection stays within some predetermined limits. If transmission power control takes place independently in all connections, a so-called "coctail party" phenomenon easily follows in which one transmitter raises its transmission power level causing increasing interference to all other simultaneous connections, which in turn causes all other transmitters to raise their power so that the effect continues until everybody is shouting at full power without still being able to get a message through.

To minimize the interference caused to the cellular radio system by the accessory interface it is advantageous to take some precautions. In a very simple embodiment of the invention there is defined a constant transmission power for the accessory interface, the value of which is so low that it only facilitates a communication within a very small distance, like a few meters. The drawback of such a simple embodiment is that the predetermined constant transmission power is in only few practical situations the optimal value for obtaining a good transmission quality and simultaneously not unnecessarily depleting the battery of a portable terminal. In a slightly more sophisticated embodiment there are predetermined constant minimum and maximum transmission power levels for the accessory interface, between which the terminal and the accessory device may apply any known open-loop or closed-loop power control scheme for finding an optimal transmission power level for both of them. In a still more flexible arrangement each base station of the cellular radio system regularly transmits, as a part of a known cell broadcast message, the currently valid values for the minimum and maximum transmission power levels for any accessory interfaces that are operational within the cell of that particular base station. In those embodiments where the base station separately allocates a spreading code for each accessory interface it is even possible for the base station to monitor the interference level associated with each allocated code and give commands for changing the accessory interface transmission power level at the terminal to the accessory interface of which the monitored spreading code has been allocated. In all cases it may be advantageous to reserve to the base station the right to prohibit the operation of all radio-operated accessory interfaces (and indeed all other radio traffic within a certain frequency band as well) within the cell for a certain time, if for example an emergency call has difficulties in coming through.

Finally, we will discuss some alternatives to the CDMA embodiment discussed above. In a TDMA-based cellular radio system there is defined in each cell a transmission frame structure consisting of a predefined number of successive time slots. Many times the transmission frames (at least on a certain frequency, if there are several frequency bands allocated to the cell) are not full, whereby during certain time slots there is no radio traffic on the air in that cell. It is possible to allocate the free time slots to the use of accessory interfaces much in the same way as the unused codes in the CDMA embodiment. Also within the TDMA embodiment of the invention an advantageous way of selecting a free time slot is to have either the terminal or the accessory device or both measuring the level of the radio signal received in each time slot, and identifying as free time slots those of them during which the received signal level is not higher than a predetermined threshold value.

An alternative is to have the base station regularly declaring, which time slots are free to be used for traffic related to accessory interfaces. This alternative is especially applicable to a proposal for the frame structure of a future cellular radio system, in which the base station (or some other device responsible for the allocation of time slots) takes into the account the carrier to interference ratio or other interference-related characteristic required by each connection when allocating the time slots. The base station or other device may find that even if there is a certain allocated time slot, the connection to which that time slot has been allocated is so strong that it can tolerate some minor interference caused by a (number of) simultaneous low-power accessory interface connection(s). Therefore the same time slot may be declared as freely usable for accessory interfaces.

In an FDMA embodiment of the invention most of the preceding discussion applies if only "code" or "time slot" is replaced with "frequency".

The selection rules 1)–4) given above for codes are easily generalised for time slots and/or frequencies. A terminal or an accessory device may always monitor the received power level in a certain time slot and/or frequency, and select a free time slot and/or frequency in accordance with selection rule 1). The monitoring may also concern only those time slots and/or frequencies that have been exclusively allocated for the purposes of accessory interfacing, in accordance with selection rule 2). Each accessory interface may have a constant predetermined frequency or time slot (the time slot being defined relative to some general time base) as in selection rule 3), or the base station may indicate the allowable time slots and/or frequencies according to selection rule 4). Setting up, maintaining and closing a communication connection between the terminal and the accessory device take place with only minor changes in the details.

The structure required of the radio apparatuses by the TDMA embodiment or the FDMA embodiment of the invention is somewhat different than what we have described above in connection with the CDMA embodiment. To use some otherwise unused time slots it is not necessary to make any structural changes to a known TDMA radio transceiver. It suffices to program the control block of the transceiver so that during the time slots allocated for accessory interfacing it harnesses the radio frequency parts to the transmission of accessory-related information exactly in the same way as they are used for transmission of information related to the cellular radio system during the appropriate time slots. If a terminal of a FDMA cellular radio system is to be used simultaneously for communicating with a base station and an accessory device, it must comprise a separate radio transceiver for both in order for the different frequencies not to interfere with each other.

It is also possible to combine the above-discussed embodiments in various ways. When all the CDMA, TDMA and FDMA embodiments are considered together, the otherwise unused code, time slot or frequency that the accessory interface takes advantage of may be designated as a "radio channel".

The advantages of the invention are most prominently seen in the structure of the terminal, because all physical means for a completely different type of interface like a cable connection or an infrared link are avoided. In addition to the already indicated savings in space and power consuption there is the additional advantage that a user that uses the terminal simply as a terminal of the cellular radio system and never needs any accessory devices will not feel that he or she has paid unnecessarily much for some features that he or she will never use anyway. An accessory device must include a radio transceiver instead of a cable connector or an infrared link, which may slightly increase the complexity and manufacturing costs. However, if the structure and functions on the accessory device side are kept as simple as possible (for example by requiring only the terminal to be able to select a channel), said additional complexity and manufacturing costs remain close to insignificance.

What is claimed is:

1. A method for establishing a local communication connection between a terminal of a cellular radio system and an accessory device, said device having at least one feature missing from said terminal, which terminal comprises a radio transceiver for communicating with a base station of a cellular radio system, said method comprising the steps of:

identifying a radio channel on which there is no perceivable radio traffic in the cellular radio system, and establishing a communication connection between the terminal and the accessory device on the identified radio channel using said radio transceiver of the terminal.

2. A method according to claim 1, wherein the step of identifying a radio channel comprises the substeps of:

picking a radio channel from a predefined set of radio channels available for radio communication between the terminal and a base station in the cell where the terminal is currently residing, measuring the power received on the picked radio channel and comparing the measured power to a predetermined threshold value, and as mutually alternative options, accepting the picked radio channel as the radio channel to be identified if the measured power is found to be lower than said predetermined threshold value, or rejecting the picked radio channel and picking another radio channel if the measured power is found to be higher than said predetermined threshold value.

3. A method according to claim 2, wherein the substep of picking a radio channel corresponds to picking a radio channel randomly.

4. A method according to claim 1, wherein the step of identifying a radio channel comprises the substeps of:

picking a radio channel from a predefined set of radio channels not available for radio communication between the terminal and a base station in the cell where the terminal is currently residing, measuring the power received on the picked radio channel and comparing the measured power to a predetermined threshold value, and as mutually alternative options, accepting the picked radio channel as the radio channel to be identified if the measured power is found to be lower than said predetermined threshold value, or rejecting the picked radio channel and picking another radio channel if the measured power is found to be higher than said predetermined threshold value.

5. A method according to claim 4, wherein the substep of picking a radio channel corresponds to picking a radio channel from a predefined set of radio channels available for radio communication between the terminal and a base station in at least one other cell than the one where the terminal is currently residing.

6. A method according to claim 4, wherein the substep of picking a radio channel corresponds to picking a radio channel from a predefined set of radio channels not available for radio communication between the terminal and a base station in any cell of the cellular radio system.

7. A method according to claim 1, wherein the step of identifying a radio channel comprises the substeps of:

requesting the cellular radio system to send information about the availability of radio channels, receiving a piece of information from the cellular radio system, and on the basis of a piece of information received from the cellular radio system, identifying a radio channel on which there is no perceivable radio traffic.

8. A method according to claim 7, wherein the substep of receiving a piece of information from the cellular radio system comprises the step of receiving a list of available radio channels.

9. A method according to claim 7, wherein the substep of receiving a piece of information from the cellular radio system comprises the step of receiving an allocation of a single radio channel.

10. A method according to claim 1, comprising the substeps of:
establishing in the terminal the need for establishing said communication connection and
identifying a radio channel through operation of the terminal.

11. A method according to claim 1, comprising the substeps of:
establishing in the accessory device the need for establishing said communication connection, and
identifying a radio channel through operation of the accessory device.

12. A method according to claim 1, comprising the substeps of:
establishing in the accessory device the need for establishing said communication connection,
communicating from the accessory device to the terminal the need for establishing said communication connection, and
identifying a radio channel through operation of the terminal.

13. A method according to claim 1, wherein the step of identifying a radio channel corresponds to identifying a spreading code with which there is not currently received a power level that is significantly higher than the general received noise power level.

14. A method according to claim 1, wherein the step of identifying a radio channel corresponds to identifying an unassigned time slot in the frame structure of the cell where the terminal is currently residing.

15. A method according to claim 1, wherein the step of identifying a radio channel corresponds to identifying an unassigned frequency in the cell where the terminal is currently residing.

16. A terminal for a cellular radio system, comprising:
an adjustable radio transceiver for establishing communication connections with a base station on a selectable radio channel,
means for identifying a radio channel on which there is no perceivable radio traffic in the cellular radio system, and
means for establishing a local communication connection between the terminal and an accessory device on the identified radio channel, said device having at least one feature missing from said terminal;
wherein said means for establishing a local communication connection between the terminal and an accessory device comprises said adjustable radio transceiver.

17. A terminal according to claim 16, wherein the terminal is a CDMA terminal with a multichannel radio transceiver that comprises a number of parallel code channel receivers and a number of parallel code channel transmitters, whereby said means for establishing a local communication connection comprise means for allocating at least one code channel receiver and at least one code channel transmitter for communication between the terminal and said accessory device.

18. A terminal according to claim 17, wherein said parallel code channel receivers and parallel code channel transmitters are all allocatable for communication between the terminal and a base station of the cellular radio system, whereby an allocation of at least one code channel receiver and at least one code channel transmitter for communication between the terminal and said accessory device corresponds to a temporarily decrease in the number of parallel code channel receivers and parallel code channel transmitters that are available for communication between the terminal and a base station.

19. A terminal according to claim 17, comprising a fixed number of parallel code channel receivers and parallel code channel transmitters that are allocatable for communication between the terminal and a base station of the cellular radio system, and additionally at least one code channel receiver and at least one code channel transmitter that are allocatable for communication between the terminal and said accessory device.

20. A terminal according to claim 17, comprising:
means for picking a code from a predefined set of codes available for radio communication between the terminal and a base station in the cell where the terminal is currently residing, and setting the picked code as the receiving code of one of the parallel code channel receivers,
means for measuring the power received by said one of the parallel code channel receivers with the picked code and comparing the measured power to a predetermined threshold value, and
means for selecting one of the mutually alternative options of:
accepting the picked code as the receiving code of the code channel to be identified if the measured power is found to be lower than said predetermined threshold value, and setting the corresponding transmitting code as the transmitting code of one of the parallel code channel transmitters, or
rejecting the picked code and picking another code if the measured power is found to be higher than said predetermined threshold value.

21. A terminal according to claim 16, wherein the terminal is a TDMA terminal with a radio transceiver that comprises means for enabling transmission and reception in selectable time slots, whereby said means for establishing a local communication connection comprise means for enabling transmission to the accessory device and reception from the accessory device in certain selected time slots.

22. A terminal according to claim 16, wherein the terminal is a FDMA terminal with a multifrequency radio transceiver that comprises a number of parallel frequency channel receivers and a number of parallel frequency channel transmitters, whereby said means for establishing a local communication connection comprise means for allocating at least one frequency channel receiver and at least one frequency channel transmitter for communication between the terminal and said accessory device.

23. An accessory device arranged for establishing a local communication connection between it and a terminal of a cellular radio system, comprising an adjustable radio transceiver for establishing communication connections with the terminal on a selectable radio channel, wherein said adjustable radio transceiver is arranged for establishing communication connections with the terminal on a selectable radio channel of the cellular radio system, said device having at least one feature missing from said terminal.

24. An accessory device according to claim 23, further comprising means for identifying a radio channel on which there is no perceivable radio traffic in the cellular radio system and means for establishing a local communication connection between the accessory device and the terminal on the identified radio channel.

25. An accessory device according to claim 23, further comprising means for requesting the terminal to identify a radio channel on which there is no perceivable radio traffic in the cellular radio system and means for establishing a local communication connection between the accessory device and the terminal on the identified radio channel.

26. An accessory device according to claim 23, comprising a multichannel radio transceiver that comprises at least one code channel receiver and at least one code channel transmitter.

27. A method for establishing a local communication connection between a terminal of a cellular radio system and an accessory device, comprising the steps of:
   identifying a radio channel on which there is no perceivable radio traffic in the cellular radio system, and
   establishing a communication connection between the terminal and the accessory device on the identified radio channel,
wherein the step of identifying a radio channel comprises the substeps of:
   picking a radio channel from a predefined set of radio channels not available for radio communication between the terminal and a base station in the cell where the terminal is currently residing,
   measuring the power received on the picked radio channel and comparing the measured power to a predetermined threshold value, and
   as mutually alternative options, accepting the picked radio channel as the radio channel to be identified if the measured power is found to be lower than said predetermined threshold value, or rejecting the picked radio channel and picking another radio channel if the measured power is found to be higher than said predetermined threshold value.

28. A method according to claim 27, wherein the substep of picking a radio channel corresponds to picking a radio channel from a predefined set of radio channels available for radio communication between the terminal and a base station in at least one other cell than the one where the terminal is currently residing.

29. A method according to claim 27, wherein the substep of picking a radio channel corresponds to picking a radio channel from a predefined set of radio channels not available for radio communication between the terminal and a base station in any cell of the cellular radio system.

30. A method according to claim 27, comprising the substeps of:
   establishing in the terminal the need for establishing said communication connection, and
   identifying a radio channel through operation of the terminal.

31. A method according to claim 27, comprising the substeps of:
   establishing in the accessory device the need for establishing said communication connection and
   identifying a radio channel through operation of the accessory device.

32. A method according to claim 27, comprising the substeps of:
   establishing in the accessory device the need for establishing said communication connection,
   communicating from the accessory device to the terminal the need for establishing said communication connection, and
   identifying a radio channel through operation of the terminal.

33. A method according to claim 27, wherein the step of identifying a radio channel corresponds to identifying a spreading code with which there is not currently received a power level that is significantly higher than the general received noise power level.

34. A method according to claim 27, wherein the step of identifying a radio channel corresponds to identifying an unassigned time slot in the frame structure of the cell where the terminal is currently residing.

35. A method according to claim 28, wherein the step of identifying a radio channel corresponds to identifying an unassigned frequency in the cell where the terminal is currently residing.

36. A terminal for a cellular radio system, comprising:
   an adjustable radio transceiver for establishing communication connections with a base station on a selectable radio channel,
   means for identifying a radio channel on which there is no perceivable radio traffic in the cellular radio system, and
   means for establishing a local communication connection between the terminal and an accessory device on the identified radio channel,
   wherein the terminal is a CDMA terminal with a multichannel radio transceiver that comprises a number of parallel code channel receivers and a number of parallel code channel transmitters, said means for establishing a local communication connection comprise means for allocating at least one code channel receiver and at least one code channel transmitter for communication between the terminal and said accessory device, and
   a fixed number of parallel code channel receivers and parallel code channel transmitters are allocatable for communication between the terminal and a base station of the cellular radio system, and additionally at least one code channel transmitter is allocatable for communication between the terminal and said accessory device.

37. A terminal for a cellular radio system, comprising:
   an adjustable radio transceiver for establishing communication connections with a base station on a selectable radio channel,
   means for identifying a radio channel on which there is no perceivable radio traffic in the cellular radio system, and
   means for establishing a local communication connection between the terminal and an accessory device on the identified radio channel,
   wherein the terminal is a CDMA terminal with a multichannel radio transceiver that comprises a number of parallel code channel receivers and a number of parallel code channel transmitters, said means for establishing a local communication connection comprise means for allocating at least one code channel receiver and at least one code channel transmitter for communication between the terminal and said accessory device, and
   further comprising means for picking a code from a predefined set of codes available for radio communication between the terminal and a base station in the cell where the terminal is currently residing, and setting the picked code as the receiving code of one of the parallel code channel receivers, means for measuring the power received by said one of the parallel code channel receivers with the picked code and comparing the measured power to a predetermined threshold value, and means for selecting one of the mutually alternative options of:
    accepting the picked code as the receiving code of the code channel to be identified if the measured power is found to be lower than said predetermined threshold value, and setting the corresponding transmitting code as the transmitting code of one of the parallel code channel transmitters, or rejecting the picked code and picking another code if the measured power is found to be higher than said predetermined threshold value.

* * * * *

UNITED STATES PATENT AND TRADEMARK OFFICE
CERTIFICATE OF CORRECTION

PATENT NO. : 6,775,558 B1 Page 1 of 1
DATED : August 10, 2004
INVENTOR(S) : Ranta et al.

It is certified that error appears in the above-identified patent and that said Letters Patent is hereby corrected as shown below:

Column 16,
Line 15, "Claim 28" should read -- Claim 27 --

Signed and Sealed this

Second Day of November, 2004

JON W. DUDAS
*Director of the United States Patent and Trademark Office*